United States Patent [19]
Liu et al.

[11] Patent Number: 6,088,793
[45] Date of Patent: *Jul. 11, 2000

[54] METHOD AND APPARATUS FOR BRANCH EXECUTION ON A MULTIPLE-INSTRUCTION-SET-ARCHITECTURE MICROPROCESSOR

[75] Inventors: Kin-Yip Liu, Millbrae; Millind Mital, South San Francisco; Kenneth Shoemaker, Los Altos Hills, all of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,237

[22] Filed: Dec. 30, 1996

[51] Int. Cl.$^7$ ....................................................... G06F 9/38
[52] U.S. Cl. .......................... 712/239; 712/233; 712/237; 712/238; 712/239; 712/240
[58] Field of Search ..................................... 395/376, 381, 395/383, 385, 387, 580, 581, 584, 585, 586, 587, 588, 589, 590; 712/207, 208, 211, 233, 237, 238, 239, 240

[56] References Cited

U.S. PATENT DOCUMENTS

| | | | |
|---|---|---|---|
| 4,394,729 | 7/1983 | Armstrong | 364/200 |
| 4,750,112 | 6/1988 | Jones et al. | 364/200 |
| 4,853,840 | 8/1989 | Shibuya | 395/375 |

(List continued on next page.)

OTHER PUBLICATIONS

Subroutine Return Address Stack, IBM Technical Disclosure Bulletin, Dec. 1981, vol. 24, No. 7A, pp. 3255–3258.
Highly Accurate Subroutine Stack Prediction Mechanism, IBM Technical Disclosure Bulletin, Mar. 1986, vol. 28, No. 10, pp. 4635–4637.
Subroutine Call/Return Stack, IBM Technical Disclosure Bulletin, Apr. 1988, vol. 30, No. 11, pp. 221–225.
Branch Prediction Strategies and Branch Target Buffer–Design, Johnny K. F. Lee and Alan Jay Smith, Jan. 1984, pp. 6–22.
Superscalar Microprocessor Design, Instruction Fetching and Decoding, Mike Johnson, 1991, pp. 57–85.
Two–Level Adaptive Training Branch Prediction, Tse–Yu Ych and Yale N. Patt, 1991, pp. 51–61.

(List continued on next page.)

*Primary Examiner*—Meng-Ai T. An
*Assistant Examiner*—Dzung C Nguyen
*Attorney, Agent, or Firm*—Gene Su

[57] ABSTRACT

A microprocessor capable of predicting program branches includes a fetching unit, a branch prediction unit, and a decode unit. The fetching unit is configured to retrieve program instructions, including macro branch instructions. The branch prediction unit is configured to receive the program instructions from the fetching unit, analyze the program instructions to identify the macro branch instructions, determine a first branch prediction for each of the macro branch instructions, and direct the fetching unit to retrieve the program instructions in an order corresponding to the first branch predictions. The decode unit is configured to receive the program instructions in the order determined by the branch prediction unit, break down the program instructions into micro-operations, and determine a decoded branch micro-operation corresponding to each of the macro branch instructions requiring verification, such that each of the decoded branch micro-operations has a decoded branch outcome of taken, if the first branch prediction is incorrect, and not taken if the first branch prediction is correct. The microprocessor may also include an execution engine configured to execute the micro-operations and determine the decoded branch outcome for each of the decoded branch micro-operations and communicate each decoded branch outcome of taken to the fetching unit such that the fetching unit can re-retrieve the program instructions in a corrected order corresponding to each incorrect first branch prediction.

22 Claims, 13 Drawing Sheets

U.S. PATENT DOCUMENTS

| | | | |
|---|---|---|---|
| 4,991,080 | 2/1991 | Emma et al. | 364/200 |
| 5,072,364 | 12/1991 | Jardine et al. | 395/375 |
| 5,136,696 | 8/1992 | Beckwith et al. | 395/375 |
| 5,142,634 | 8/1992 | Fite et al. | 395/375 |
| 5,155,843 | 10/1992 | Stamm et al. | 395/575 |
| 5,163,140 | 11/1992 | Stiles et al. | 395/425 |
| 5,179,673 | 1/1993 | Steely, Jr. et al. | 395/375 |
| 5,265,213 | 11/1993 | Weiser et al. | 395/375 |
| 5,276,882 | 1/1994 | Emma et al. | 395/700 |
| 5,283,873 | 2/1994 | Steely, Jr. et al. | 395/384 |
| 5,313,634 | 5/1994 | Eickemeyer | 395/700 |
| 5,353,421 | 10/1994 | Emma et al. | 395/375 |
| 5,355,459 | 10/1994 | Matsuo et al. | 395/375 |
| 5,367,703 | 11/1994 | Levitan | 395/800 |
| 5,414,822 | 5/1995 | Saito et al. | 395/375 |
| 5,434,985 | 7/1995 | Emma et al. | 395/375 |
| 5,442,756 | 8/1995 | Grochowski et al. | 395/375 |
| 5,542,109 | 7/1996 | Blomgren et al. | 395/800 |
| 5,561,776 | 10/1996 | Popescu et al. | 395/375 |
| 5,577,217 | 11/1996 | Hoyt et al. | 395/376 |
| 5,584,001 | 12/1996 | Hoyt et al. | 395/585 |
| 5,589,001 | 12/1996 | Maeda et al. | 118/722 |
| 5,592,636 | 1/1997 | Popescu et al. | 395/586 |
| 5,608,885 | 3/1997 | Gupta et al. | 395/380 |
| 5,664,136 | 9/1997 | Witt et al. | 395/384 |
| 5,687,338 | 11/1997 | Boggs et al. | 395/381 |
| 5,706,492 | 1/1998 | Hoyt et al. | 395/585 |
| 5,796,973 | 8/1998 | Witt et al. | 395/384 |
| 5,812,839 | 9/1998 | Hoyt et al. | 395/586 |

OTHER PUBLICATIONS

Improving the Accuracy of Dynamic Branch Prediction Using Branch Correlation, Shien–Tai Pan, Kimming So, Joseph T. Rahmeh, 1992, pp. 76–84.

A Comprehensive Instruction Fetch Mechanism for a Processor Supporting Speculative Execution, Tse–Yu Yeh and Yale N. Patt, 1992, pp. 129–139.

Return Address Stack Cache, IBM Technical Disclosure Bulletin, vol. 34, No. 11, Apr. 1992, pp. 269–271.

Alternative Implementations of Two–Level Adaptive Branch Prediction, The 19th Annual International Suymposium on Computer Architecture, The Association for Computing Machinery, pp. 125–134.

Branch History Table Indexing to Prevent Pipeline Bubbles in Wide–Issue superscalar Processors, Tse–Yu Yeh and Yale N. Patt, 1993, pp. 164–175.

A Comparison of Dynamic Branch Predictors That Use Two Levels of Branch History, Tse–Uy Ueh and Yale N. Patt, 1993, pp. 257–266.

| | BTB | | BAC | | | | | Branch Resolution | |
|---|---|---|---|---|---|---|---|---|---|
| | | | Prediction | | Validation | | Validation of | | |
| | Miss | Hit | Taken | Not Taken | Decision | Target | Decision | Target | |
| Relative Jump/Call | X | | X | | | | | | |
| | | X | | | | X | | | |
| Register Indirect Jump/Call ("compr" op) | X | | X | | | | | X | |
| | | X | | | X | | | X | |
| Return ("compr" op) | X | | X | | | | | X | |
| | | X | | | X | | | X | |
| Conditional Jump ("tbit" op) Forward | X | | | X | | | X | X | |
| Backward | X | | X | | | | X | X | |

FIG. 10

| Branch Resolution Table (BRT) | | | | | | | | |
|---|---|---|---|---|---|---|---|---|
| (32) | (32) | (2) | (1) | (1) | (4) | (20) | (1) | |
| Redirect IP 1105 | Target VIP 1110 | Branch Type 1115 | Prediction 1120 | BTB Predicioin 1125 | BRT Bactos 1135 | BLIP 1140 | ATLIP Segment Violation 1145 | ← head_pt ← tail_pt |

FIG. 11

| BPU 130 Prediction 1305 | Taken Indicated by 1310 | Sense 1300 |
|---|---|---|
| 0 | 0 | 0 |
| 0 | 1 | 1 |
| 1 | 0 | 1 |
| 1 | 1 | 0 |

FIG. 13

METHOD AND APPARATUS FOR BRANCH EXECUTION ON A MULTIPLE-INSTRUCTION-SET-ARCHITECTURE MICROPROCESSOR

BACKGROUND OF THE INVENTION

1. Field of the Invention

The present invention relates generally to branch prediction in a microprocessor system and, more particularly, to a method and apparatus for predicting branches to be taken in a microprocessor system capable of executing a plurality of instruction sets.

2. Description of the Related Art

A microprocessor's performance is directly related to the amount of time it is busy executing instructions. It achieves maximum performance if it never sits idle waiting on fetches from memory or I/O. The microprocessor has an efficiency circuit called the prefetch unit, which has the responsibility of keeping the execution unit as busy as possible by providing a constant flow of instructions. The prefetch unit is responsible for keeping enough instructions on hand so the microprocessor does not stop its execution flow to fetch an instruction from memory. This look-ahead feature can significantly increase performance, because much of the time, the next instruction is already waiting at the first stage of the microprocessor's execution pipeline. If instructions are sequentially stored, prefetching almost guarantees that the next instruction will always be ready.

However, instruction sequences are not always stored in memory one after another. Software contains branches or jumps in instruction flow that cause the microprocessor to jump around to different sections of code depending on the task being executed. The prefetch unit can keep track of the current instruction flow, but it doesn't know the future.

Performance of the microprocessor is further enhanced by a second efficiency circuit called the branch prediction unit, which works in concert with the prefetch unit. The branch prediction unit, as its name suggests, attempts to predict whether a branch will be taken. As long as the branch prediction unit is right, the prefetch unit speeds along retrieving the next instruction to be executed. In Intel's Pentium microprocessor, the branch prediction unit is typically right about 90% of the time, resulting in an overall performance increase of about 25%. A wrong prediction is corrected in about 3 or 4 clock cycles. That is, once the branch prediction unit determines that its prediction was wrong, it flushes the pipeline of instructions, and passes the address for the correct next instruction to the prefetch unit. The prefetch unit again speeds along fetching the next series of instructions to be executed.

The method used to accurately predict branches is highly dependent upon the architecture of the instruction set being executed. An efficient method of predicting branches in a RISC microprocessor may not be efficient, or even applicable, to a CISC microprocessor. Accordingly, in a microprocessor intended to execute two or more instruction sets by translating the instructions into a common instruction set, branch prediction becomes more complex.

The present invention is directed to overcoming, or at least reducing the effects of, one or more of the problems set forth above by providing a novel and nonobvious method and apparatus for predicting branches in a multiple instruction-set architecture microprocessor.

SUMMARY OF THE INVENTION

In accordance with one aspect of the present invention, there is provided a microprocessor capable of predicting program branches including a fetching unit, a branch prediction unit, and a decode unit. The fetching unit is configured to retrieve program instructions, including macro branch instructions. The branch prediction unit is configured to receive the program instructions from the fetching unit, analyze the program instructions to identify the macro branch instructions, determine a first branch prediction for each of the macro branch instructions, and direct the fetching unit to retrieve the program instructions in an order corresponding to the first branch predictions. The decode unit is configured to receive the program instructions in the order determined by the branch prediction unit, break down the program instructions into micro-operations, and determine a decoded branch micro-operation corresponding to each of the macro branch instructions requiring verification, such that each of the decoded branch micro-operations has a decoded branch outcome of taken, if the first branch prediction is incorrect, and not taken if the first branch prediction is correct.

In accordance with another aspect of the present invention, there is provided a method for predicting program branches in a microprocessor. The method includes fetching program instructions to be executed by the microprocessor, wherein the program instructions include macro branch instructions; analyzing the program instructions to identify the macro branch instructions; determining a first branch prediction for each of the macro branch instructions; ordering the fetched program instructions corresponding to the first branch predictions; decoding the program instructions to break down the program instructions into micro-operations; and determining a decoded branch micro-operation corresponding to each of the macro branch instructions requiring verification, wherein each of the decoded branch micro-operations has a decoded branch outcome of taken if the first branch prediction is incorrect, and not taken if the first branch prediction is correct.

BRIEF DESCRIPTION OF THE DRAWINGS

The foregoing and other advantages of the invention will become apparent upon reading the following detailed description and upon reference to the drawings in which:

FIG. 10 illustrates the correction and validation functions of the BAC of FIG. 9 with respect to predictions of the BTB of FIG. 5;

FIG. 11 illustrates the internal organization of a Branch Resolution Table located within the BAC of FIG. 9;

FIG. 13 illustrates the calculation of the sense bit for a branch prediction by the instruction decode unit (IDU) of FIG. 2.

Figure 1:
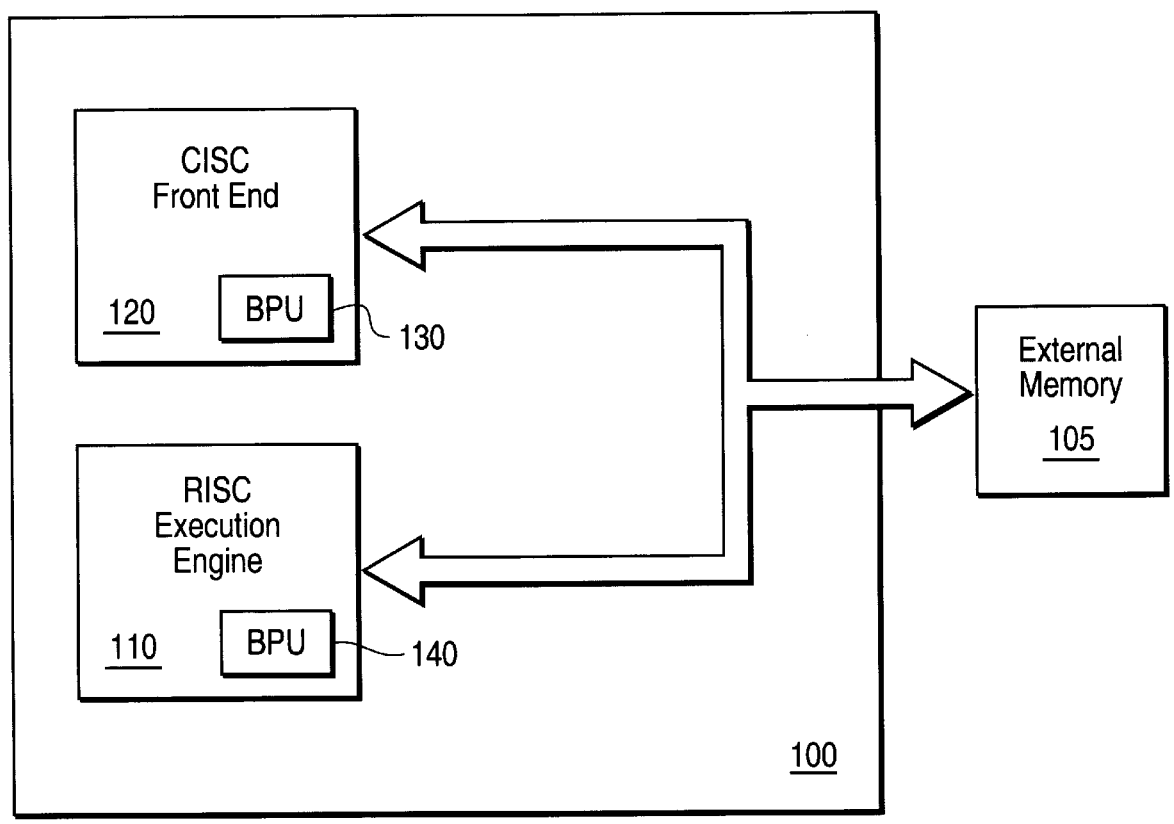
FIG. 1 illustrates a top-level block diagram of a microprocessor system interfaced with external memory.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF THE PREFERRED EMBODIMENTS

Illustrative embodiments of the invention are described below as they might be employed in a microprocessor capable of executing multiple instruction sets. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings and referring initially to FIG. 1, a microprocessor 100 is shown connected to external memory 105. The microprocessor 100 described herein is capable of executing both RISC type instructions and CISC type instructions (e.g., Intel X86 (iA) instructions). The RISC type instructions are executed directly by a RISC execution engine 110, and the CISC type instructions are first translated by the CISC front end 120 into RISC type instructions for execution by the RISC execution engine 110. To facilitate higher speed operation when executing either RISC type instructions or CISC type instructions, both the CISC front end 120 and the RISC execution engine 110 include branch prediction units (BPUs) 130, 140. The BPUs operate independent of one another, such that CISC type instructions are retrieved for decoding in an order selected by its BPU 130, and the RISC type instructions are retrieved and executed in an order determined by its BPU 140. CISC type instructions are converted into RISC type instructions in such a manner that mispredicted branches are easily identified by the branch behavior of the resulting converted RISC type instructions.

Figure 2:
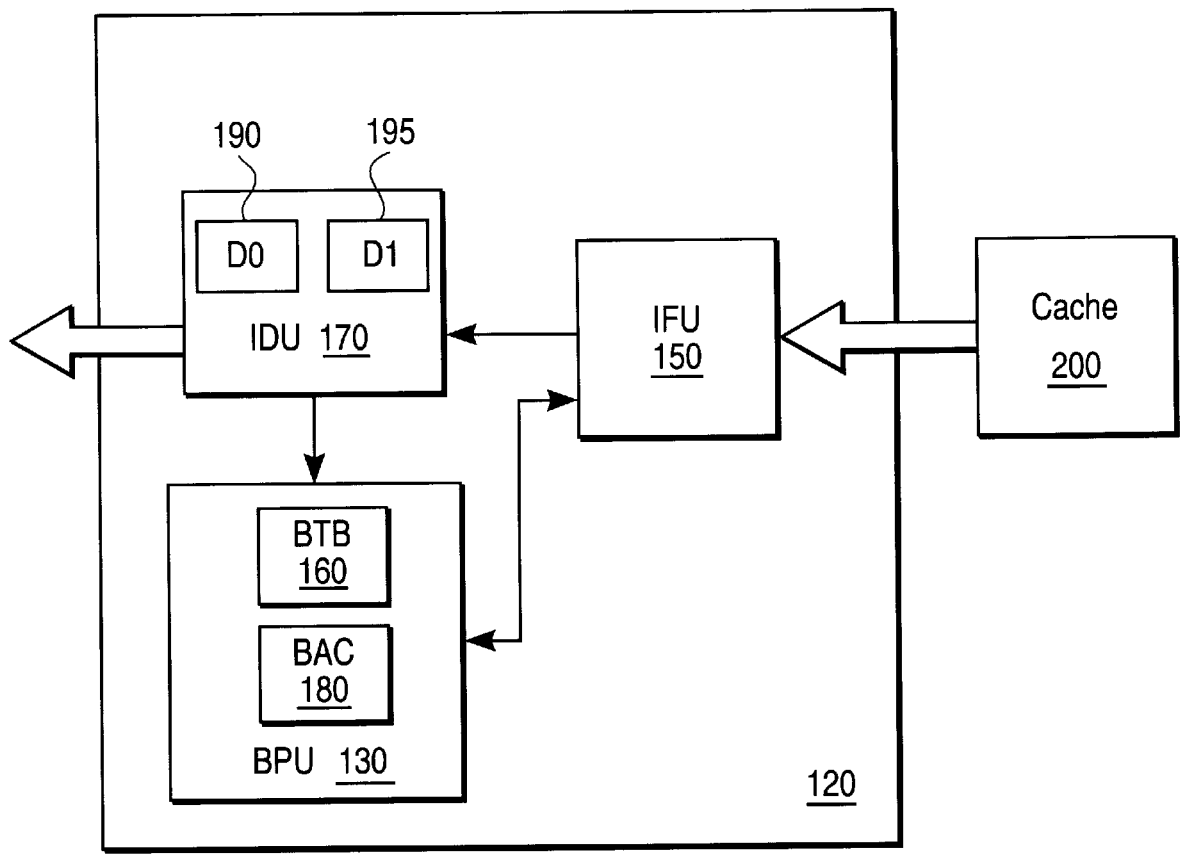
FIG. 2 illustrates a top-level block diagram of a CISC front end of the microprocessor of FIG. 1.

The operation of the CISC front end 110 may be better appreciated by reference to FIGS. 2–11, which show various portions of the CISC front end 120 in greater detail. For example, FIG. 2 shows the main components of the CISC front end 120 that impact the operation of the BPU 130. The CISC front end 120 includes an instruction fetch unit (IFU) 150, a branch target buffer (BTB) 160, an instruction decode unit (IDU) 170, and a branch address calculator (BAC) 180. Generally, the IFU 150 retrieves instructions from a cache 200, and delivers the retrieved instructions to the IDU 170, where they are decoded into micro-operations (uops) for execution by the RISC execution engine 110. The combination of the BTB 160 and the BAC 180 form the BPU 130, and act together to analyze the incoming instructions, identify macro branch instructions, and predict whether each macro branch will be taken. Whether a macro branch is predicted as being taken will have an apparent influence on the address of the instructions to be retrieved from the cache 200. Thus, the BPU 130 has a feedback path to the IFU 150. The term macro indicates that the branch command is a CISC type command. Hereinafter, macro branches will be referred to simply as branches.

Figure 3:
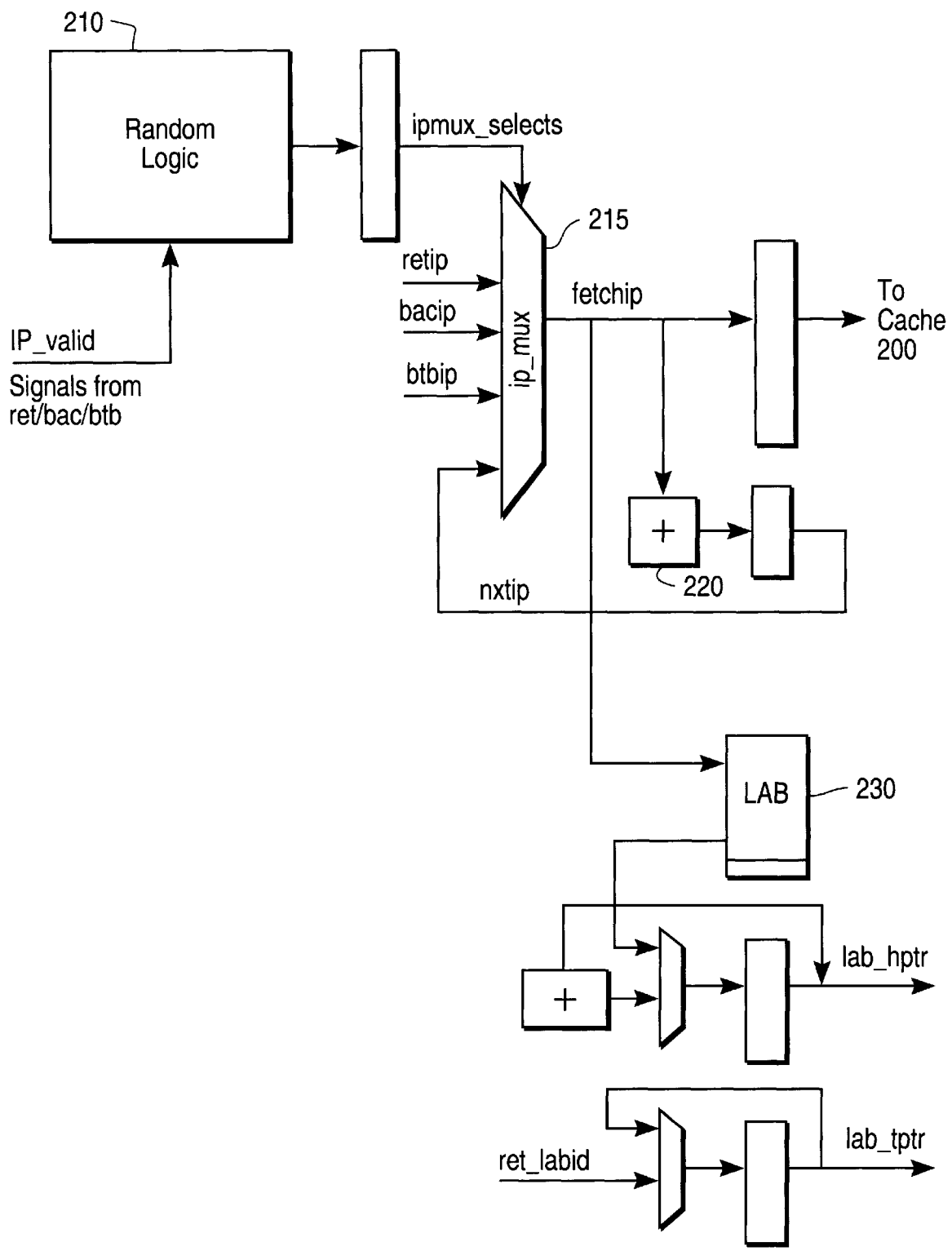
FIG. 3 illustrates a schematic for an instruction fetch unit (IFU) of the CISC front end of FIG. 2.

The structure and operation of the IFU 150 may be better appreciated by reference to FIG. 3. The main function of the IFU 150 is to interface with the cache 200 by providing an instruction pointer (IP) and receiving instructions stored in the cache (32-byte lines). The IFU 150 generates the IP based on signals from the BTB 160, BAC 180, and from the retirement logic (discussed hereinafter in conjunction with FIGS. 5–11). Ordinarily, the IFU 150 will serially retrieve each line of instructions to be executed from the cache 200. However, when a branch is present, the IFU 150 determines whether the branch will be taken, so that, if necessary, instructions from the location to which the program will branch (target address) may be retrieved. The BTB 160 and BAC 180 are responsible for determining whether branches are present in the current line of instructions.

The BTB 160 and BAC 180 each provide an IP valid signal to the IFU 150 when a branch is detected in the current line of instructions retrieved from the cache 200. The respective BTB 160 or the BAC 180 which detected the presence of a branch instruction provides an alternative instruction pointer containing the target address to where the program will branch, and signals the presence of the branch instruction to random logic 210 within the IFU 150. The random logic 210 responds to the IP valid signals from the BTB 160 or BAC 180 by outputting a signal to the select input of a multiplexer 215. The target IPs generated by the BAC 180 and BTB 160 are connected as inputs to the multiplexer 215. Thus, the random logic 210 supplies a select signal to the multiplexer 215 to select the target IP corresponding to the IP valid signal generated by the BAC 180 or BTB 160. The output of the multiplexer 215 becomes the current IP and is delivered to the cache 200.

In the event that no branches are detected by the BAC 180 or BTB 160, execution of the program will continue in its serial fashion. Accordingly, the next IP is generated by indexing the current IP. An adder 220 receives the current IP, adds one to its value, and returns it as in input to the multiplexer 215. Thus, where no IP valid signals are received by the random logic 210, the multiplexer select signal defaults to select the indexed IP and deliver it to the cache 200.

Figure 4:
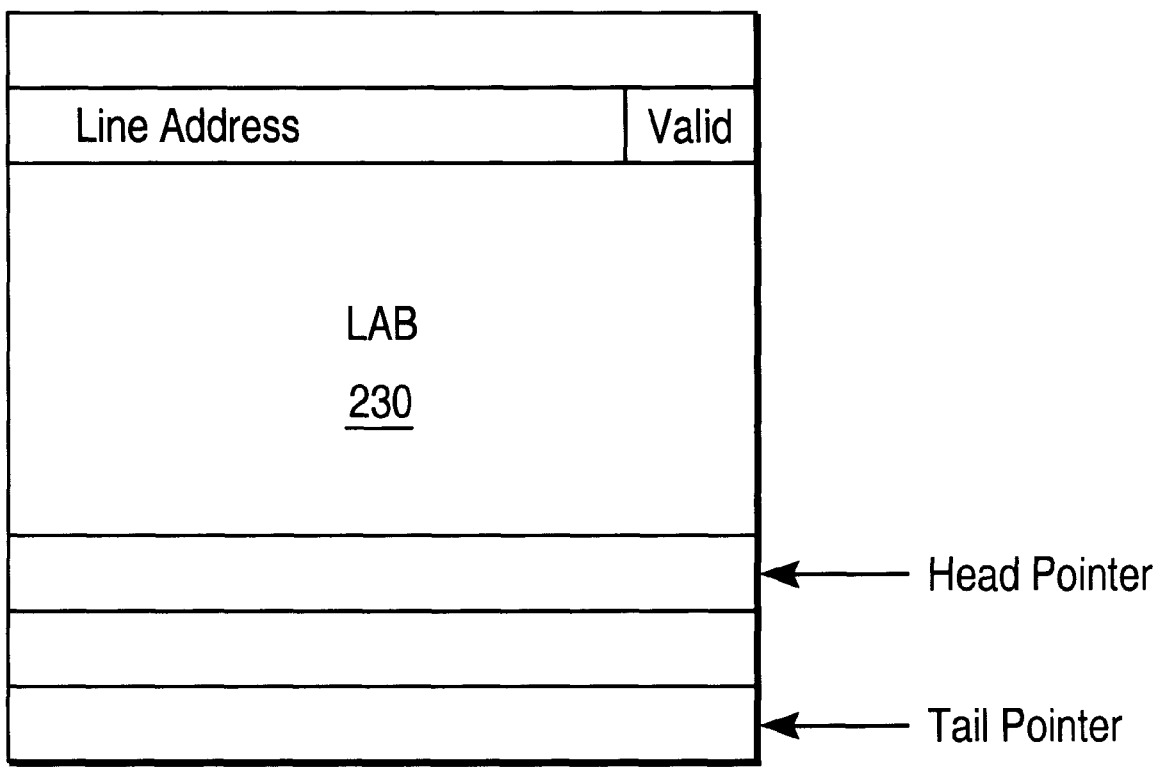
FIG. 4 illustrates a block diagram of the organization and structure of a line address buffer (LAB) of the IFU of FIG. 3.

The IFU 150 also includes a line address buffer (LAB) 230. The LAB 230 is a circular FIFO buffer with 16 to 20 entries, a head pointer, and a tail pointer. The function of the LAB 230 is to maintain a register of the address for each line of instructions retrieved from the cache 200 that have not yet been retired by the microprocessor 100. Referring briefly to FIG. 4, the internal organization and structure of the LAB 230 is shown. Each LAB entry has a 27-bit line address stored therein along with a valid bit. The valid bit is used to flash clear all entries in the event of, for example, a mispredicted branch. Entries are de-allocated by indexing the tail pointer of the FIFO. The head pointer is indexed each time an additional line of code is retrieved from the cache 200.

Indexing the tail pointer to de-allocate a LAB entry occurs when all of the instructions contained in that line of code are retired by the RISC execution engine 110.

Referring again to FIG. 3, each time a new IP is presented at the output of the multiplexer 215, that value is stored in the LAB 230, causing the LAB head pointer to be incremented by one value and point at the next available location in the LAB 230.

Figure 5:
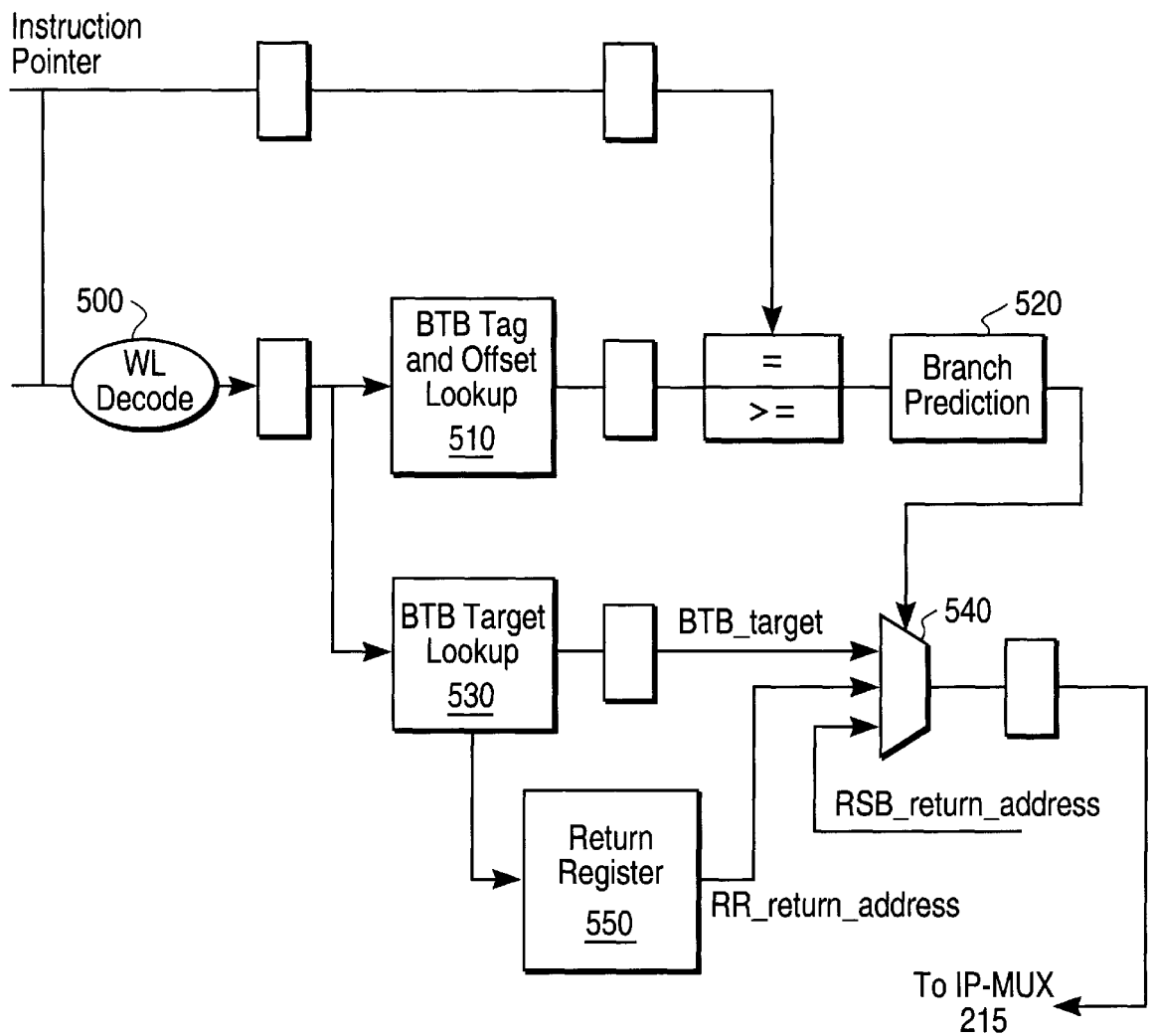
FIG. 5 illustrates a block diagram of the organization and structure of a branch target buffer (BTB) of the CISC front end of FIG. 2.
Figure 6:
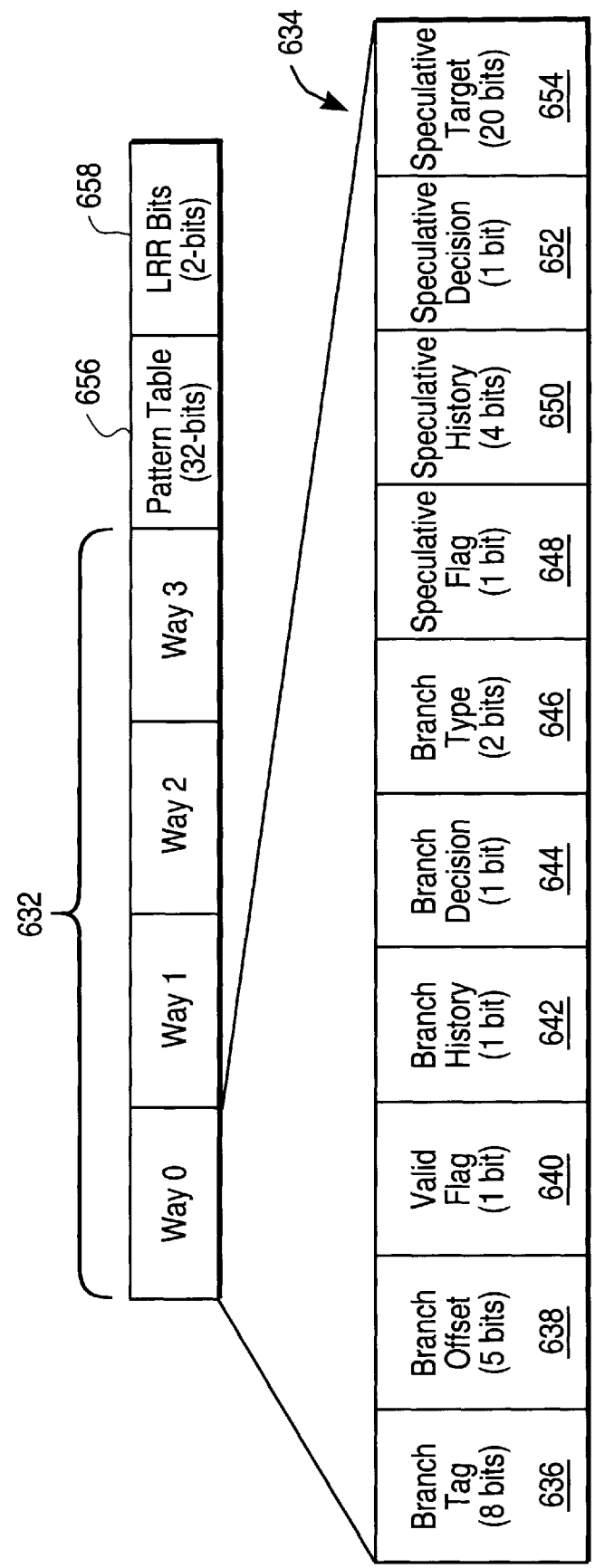
FIG. 6a illustrates the partitioning of an instruction pointer address to be used to address a cache located within the BTB of FIG. 5.
FIG. 6b illustrates the internal organization of the cache located within the BTB of FIG. 5.

Turning now to FIG. 5, the structure and operation of the BTB 160 is discussed in greater detail. The BTB 160 in the illustrative embodiment has a four-way set associative, 512 entry cache. Each time the IFU 150 requests a line of code from the cache 200, the BTB 160 is interrogated to determine if it knows of any branches that reside in the line of code being fetched based on a comparison to previously encountered branches. Previously encountered branches are stored in the BTB 160 based on the address of the last byte of the branch instruction. The BTB 160 does not interpret code, but rather checks the current IP against its sets to determine if matching branches are contained within the BTB 160.

Referring briefly to FIG. 6a, the bit partitioning applied to an IP received from the IFU 150 is shown. Bits 04 are used as an IP offset 600. Bits 5–11 are used as an IP set 610. In the illustrated embodiment, bits 12–19 are used as an IP tag 620. However, it is contemplated that in some embodiments the IP tag 620 may comprise bits 12–31.

FIG. 6b shows the fields that comprise each set 630 within the BTB 160. Each set 630 contains four ways 632. Each way 632 holds a single BTB entry 634. There are 128 sets 630 contained in the BTB 160, resulting in 512 total BTB entries 634. Each set 630 also contains a pattern table 656 and a least recently replaced (LRR) field 658, which will be discussed below. Each entry 634 comprises a branch tag 636 (8 bits), a branch offset 638 (5 bits), a valid flag 640, (1 bit), a branch history 642 (4 bits), a branch decision 644 (1 bit), a branch type 646 (2 bits), a speculative flag 648 (1 bit), a speculative history 650 (4 bits), a speculative decision 652 (1 bit), and a branch target 654 (20 bits).

Returning to FIG. 5, the IP received from the IFU 150 is partitioned as described above in reference to FIG. 6a by the WL Decode module 500. The IP set 610 has 7 bits, corresponding to a decimal number from 0 to 127. The IP set 610 indicates the set 630 in the BTB 160 to be evaluated. Lookup module 510 matches the IP set 610 to the corresponding set 630 stored in the BTB 160. The four BTB entries 634 (one for each way 632) in the matched set 630 are evaluated. All BTB entries 634 with a valid flag 640 equal to zero are discarded. Then all BTB entries 634 having a branch tag 636 that does not match the IP tag 620 are discarded. Of the remaining BTB entries 634, only those having an IP greater than or equal to the IP received from the IFU 150 (calculated using the branch offset 638) are considered for prediction. The BTB entries 634 still eligible for consideration are evaluated by the branch prediction module 520. The branch prediction module 520 selects the entries having a predicted taken branch decision (as described below in reference to FIG. 7). Of those taken branches, the BTB entry 634 having the smallest branch offset 638 is chosen. If no taken branches are predicted, the BTB 160 does not provide an IP valid signal to the random logic 210.

If a taken branch is predicted by the BTB 160, target lookup module 530 determines the branch target address corresponding to the BTB entry 634 selected by the branch prediction module 520. The branch target is generated from the upper 12 bits of the IP received from the IFU 150 and the lower 20 bits from the branch target 654 of the selected BTB entry 634. The branch target is stored in a BTB multiplexer 540. An IP valid signal is supplied to the random logic 210, and the branch target is supplied to the IP multiplexer 215 to indicate that the BTB 160 has detected a branch.

The branch type 646 bits indicate the type of branch the BTB 160 has predicted. The four types of branches that can be indicated with the branch type 646 bits are conditional, return, call, and unconditional.

If the BTB 160 detects a call type of branch, it stores the address of the instruction immediately following the call in a return register (RR) 550. The return address is computed by taking the current instruction pointer and adding the length of the call instruction plus one. The RR 550 is a 33 bit register, having two fields. The address field (32 bits) stores the address of the instruction following the call, and the valid field (1 bit) indicates that the address stored in the address field is valid. The RR 550 stores only the return address associated with the last call. The RR 550 valid field is set to zero (invalid) when the RR 550 address field is selected as a return target or when a branch misprediction is detected.

If the BTB 160 detects a return type of instruction, it uses the address in the return register 550, if valid, as the target address for the next instruction. If the RR 550 is not valid, the BAC 180 supplies the return target through its return stack buffer (RSB) 990, as described below in reference to FIG. 9.

Figures 7, 8:
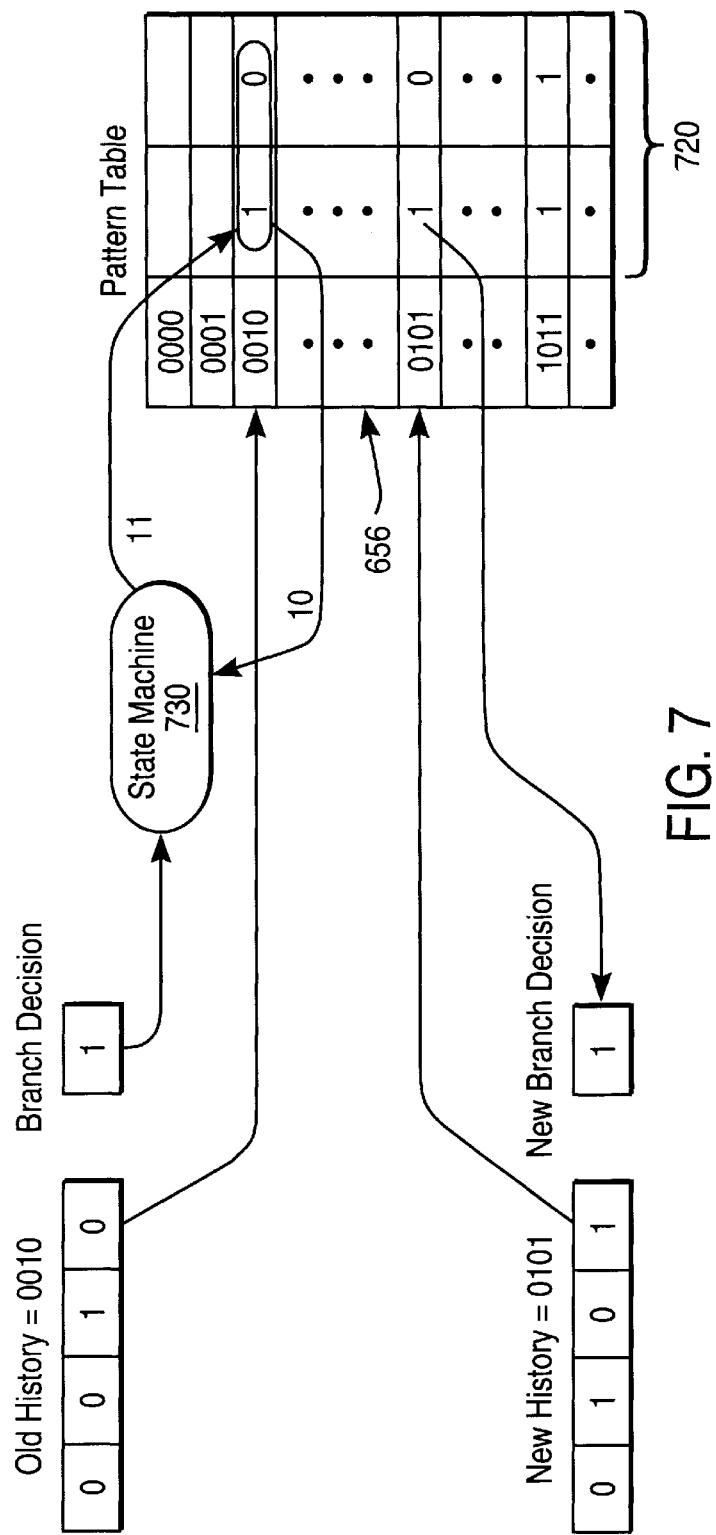
FIG. 7 illustrates a stylized representation of a branch prediction operation performed by the BTB of FIG. 5.
FIG. 8 illustrates a stylized representation of a continuation of the branch prediction operation of FIG. 7.

FIG. 7 shows the branch prediction algorithm used by the BTB 160. The branch prediction algorithm relies on the two-level adaptive training algorithm developed by Tse-Yu Yeh and Yale N. Patt. Branch history bits 642 are kept for each BTB entry 634. The branch history bits 642 are based on the outcome of actual branches, not predicted branches. The branch history bits 642 are updated only after the final outcome of the branch is known, as a result of the branch resolution done in the execution stage. The speculative history bits 650 are updated after each predicted branch outcome. To illustrate the prediction process, FIG. 7 shows a BTB entry 634 having an old branch history 700 of 0010. Assuming the branch decision was verified in the execution stage as being taken, the new branch history 710 becomes 0101, which is obtained by shifting the branch decision, 1, into the least significant bit and discarding the most significant bit of the old branch history 700.

Each set 630 of entries 634 in the BTB 160 has an associated pattern table 656, as shown in FIG. 6b. An expanded pattern table 656 is shown in FIG. 7. The 16 lines in the pattern table 656 correspond to the 16 possible patterns for the branch history 642 or the speculative history 650.

The two bit pattern table (PT) entries 720 correspond to states of the Lee and Smith 2-bit saturating up/down counter scheme, in which 00 indicates strongly not taken, 01 indicates weakly not taken, 10 indicates weakly taken, and 11 indicates strongly taken. The PT entries 720 are incremented for a taken branch and decremented for a not taken branch by state machine 730. For example, if the PT entry 720 was 01 (weakly not taken) and a branch taken was verified, the PT entry 720 would increment to 10 (weakly taken). A subsequent branch taken would increment the PT entry 720 to 11 (strongly taken). Conversely, if the entry 720 was 01 (weakly not taken) and a branch not taken was verified, the PT entry 720 would decrement to 00 (strongly not taken). The PT entry 720 can not be incremented above 11 (strongly taken) or below 00 (strongly not taken). For example, if a branch taken were to be verified with the PT entry 720 at 11, the PT entry 720 would be saturated and would remain at 11.

In the example illustrated in FIG. 7, the old branch history 700 of 0101 is used as an index to the pattern table 656, which has a PT entry 720 value of 10 (weakly taken). Because the branch was verified as taken, the PT entry 720 is incremented by the state machine 730 to 11 (strongly taken). The new branch history 710 is used to index the pattern table, yielding a PT entry 720 of 10. The most significant bit of the PT entry 720 corresponding to the new branch history 710 is used to set the branch decision 644 for the BTB entry 634 being updated.

The speculative history bits 650 are handled in a manner similar to that of the branch history bits 642. Referring to FIG. 8, a sample BTB entry 634 is shown. Only the fields required to illustrate this example are shown. Assume the BTB entry 634 was updated as described above in reference to FIG. 7. Subsequent to the update, the IFU 150 supplies an IP to the BTB 160 which corresponds to the BTB entry 634 shown in FIG. 8.

Because the speculative flag 810 is 0, the branch decision bit 820, rather than the speculative decision bit 840, is used by the branch prediction module 520 to evaluate the branch as being taken. This taken evaluation has not yet been verified in the execution stage, so only the speculative history bits 830 are updated (0101 in FIG. 8). The taken decision, 1, becomes the least significant bit of the speculative history 830, and the remaining bits are shifted to the left with the most significant bit being discarded, resulting in a new speculative history 830 of 1011. The speculative flag 810 is set to 1, to indicate that the entry 634 has been updated speculatively. The speculative decision 840 is set to 1 corresponding the most significant bit of the PT entry 720 (11) associated with the speculative history 830 of 1011.

As stated above, the branch history 850 and PT entry 720 are not updated for speculative updates. Only if the speculative branch taken decision predicted in the foregoing example was verified during execution, would the branch history 850 and pattern table 720 be updated. If subsequent to this speculative update, the IFU 150 supplies an IP to the BTB 160, which again corresponds to the BTB entry 634 shown in FIG. 8, the speculative decision bit 840 would be used by the branch prediction module 520 to evaluate the branch, because the speculative flag 810 was set to 1 above. If a branch verified in the execution stage was mispredicted, the branch history 850 is updated as described above, the branch history 850 is copied into the speculative history bits 830, and the speculative flag 810 is set to zero.

Entries 634 are allocated and de-allocated in the BTB 160 as information is received concerning the actual resolution of branch instructions. Entries 634 are de-allocated (i.e. valid flag 640 set to zero) if the BAC 180 detects that the BTB 160 has predicted a bogus branch (i.e. the decoded instruction is not a branch). The detection of bogus branches is described below in reference to FIG. 9.

It is contemplated that, branches may be allocated or updated in the BTB 160 after they have been detected by the BAC 180, or after they have been verified in the execution stage. If branches are allocated after they have been detected by the BAC 180, but before they are retired in the execution stage, corruption of the BTB 160 data may occur due to mispredicted branches which do not retire.

As stated above, branches are stored in the BTB 160 based on the address of the last byte of the branch instruction. The BAC 180 maintains a Branch Resolution Table 995 (BRT), described below in reference to FIGS. 9 and 10. If a branch is to be updated the last byte of the branch instruction (BLIP) is received from the BRT 995 and the BTB 160 is queried to determine if a corresponding BTB entry 634 exists. The BLIP is partitioned as shown in FIG. 6a. The IP set bits 610 of the BLIP indicate the set 630 to be evaluated in the BTB 160.

If the IP tag 620 and IP offset 600 of the BLIP matches the branch tag 636 and the branch offset 638 of a corresponding BTB entry 634, the branch history bits are updated as described above.

If the IP tag 620 and IP offset 600 do not match the branch tag 636 and branch offset 638 of a corresponding BTB entry 634, a new entry is allocated. The LRR bits 658 of the set 630 being evaluated point to the way 632 in the set 630 that has been least recently replaced (i.e. oldest). If the branch tag 636 of the (LRR) way 632 does not match the IP tag 620 of the BLIP, the entry is replaced. If the branch tag 636 of the LRR way 632 matches the IP tag 620 of the BLIP, the LRR 658 is incremented and the next way 632 is checked. If the IP tag 620 of the BLIP matches the branch tag 636 for all four ways 632, the entry pointed to by the LRR 658 is replaced and the LRR 658 is incremented by one.

In the event the BTB 160 is reset, the valid bit 640 is set to zero for all entries 634 in all sets 630. The pattern table 656 is set to a predetermined pattern, and the LRR field 658 is set to 00.

The BTB 160 does not actually decode the instruction associated with a given IP. Also, the BTB 160 stores only the lower 20 bits of the target IP, and the BTB 160 is not flushed on process switches. Accordingly, the BTB 160 may use information from an earlier process for the current process. Self-modifying code may also modify an instruction. Because of the situations described above, branches may be missed, branches may be mispredicted, and/or branch targets may be incorrect. Therefore, branch predictions made by the BTB 160 are verified by the BAC 180. The functions of the BAC 180 are described by referring to FIG. 9.

The BTB 160 prediction of a branch is forwarded to the BAC 180 for verification and correction, if necessary. The BAC 180 receives opcode information from the IDU 170. Based on the opcode, which reflects the actual commands to be executed, the BAC 180 provides a verification and correctness mechanism for branches whose target can be determined solely from the instruction itself. If a branch is missed by the BTB 160, the BAC 180 predicts the branch decision using a static prediction algorithm. If the BTB 160 predicts a branch, the BAC 180 verifies the branch decision. The BAC 180 re-steers the IFU 150 with the correct IP whenever the BTB 160 prediction is wrong or when the BTB 160 fails to predict a branch due to a miss.

Figure 9A:
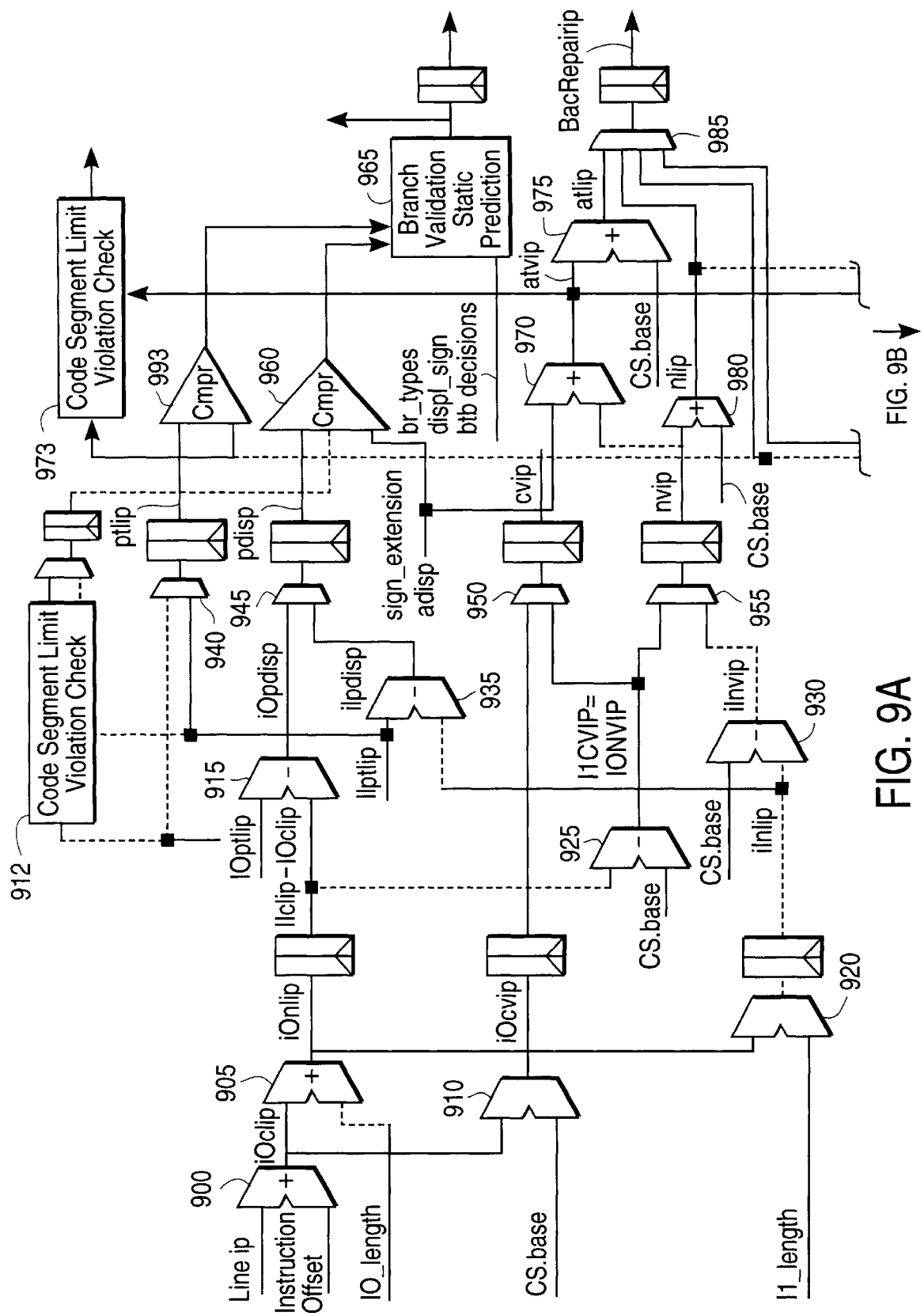
FIG. 9 illustrates a block diagram of the organization and structure of a branch address calculator (BAC) of the CISC front end of FIG. 2.
Figure 9B:
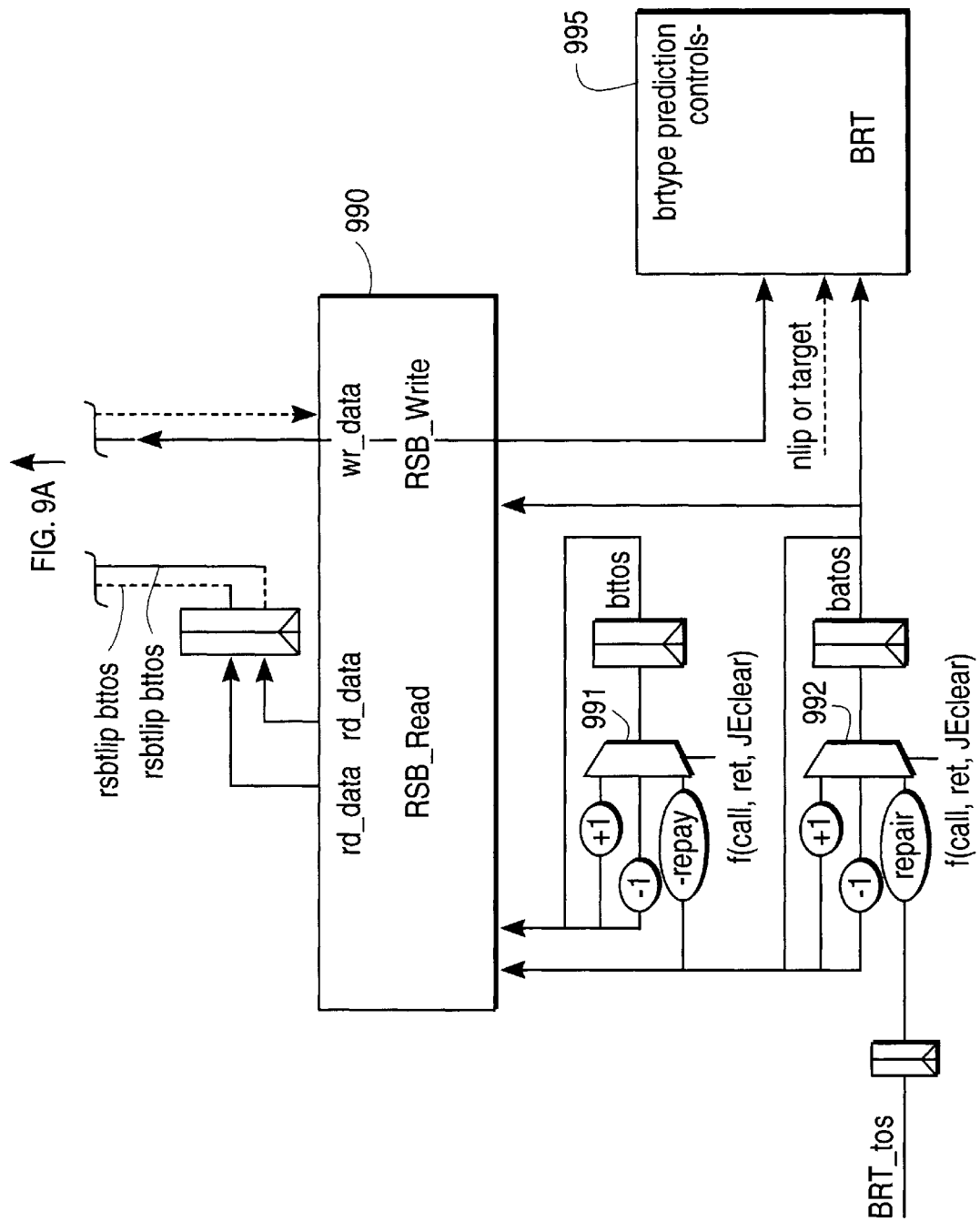

As shown in FIG. 9, the BAC 180 receives the Line Instruction Pointer and instruction offset of the starting byte from the IFU 150. The IDU 170 contains two decoders D0 190 and D1 195 as shown in FIG. 2. The actions of the BAC 180 depend on the specific decoder 190, 195 which is responsible for decoding the instruction. D0 190 and D1 195 decode instructions in parallel. Hereinafter, an instruction decoded by D0 190 will be referred to as an I0 instruction and an instruction decoded by D1 195 will be referred to as an I1 instruction. Although D0 190 and D1 195 may both decode simple instructions, complex instructions (those requiring more than four uops) are typically forced onto D0 190 for decoding.

It is contemplated that all branch instructions detected in D1 195 may be re-steered back onto D0 for processing. In this contemplated embodiment, all branches would be considered complex instructions. This approach may lessen the hardware complexity of the circuit to be described below, but may also have the effect of lessening processor performance. In the embodiment described below, both D0 190 and D1 195 decode branch instructions.

In the context of this specification, "linear" refers to a pointer specifying a 32 bit address, while "virtual" refers to a pointer wherein the code segment base (CS.Base) has been subtracted. The CS.Base is a global variable specific to the code being executed. Linear instruction pointers are referred to as LIP and virtual instruction pointers are referred to as VIP.

In reference to FIG. 9, an adder 900 adds the IP and the instruction offset received from the IFU 150 to generate the I0 current instruction linear pointer (I0CLIP). Another adder 905 adds the I0CLIP to the length of the I0 instruction to generate the I0 next linear instruction pointer (I0NLIP). A subtracter 910 subtracts the CS.Base from the I0CLIP to generate the I0 current virtual instruction pointer (I0CVIP). The I0 predicted linear target instruction pointer (I0PTLIP) supplied from the BTB 160 is checked for code segment limit violation by module 912. A code segment violation is caused by an error in the software code and is handled as a fault condition. A subtracter 915 subtracts the I0NLIP from the I0PTLIP to generate the I0 predicted displacement (I0PDISP).

For instructions being decoded by D1 195, the length of the I1 instruction is subtracted from the I0NLIP to generate the I1 next linear instruction pointer (I1NLIP) by a subtracter 920. For I1 instructions, the I1 current linear instruction pointer (I1CLIP) is equal to the I0NLIP. Subtracter 925 subtracts the CS.Base from the I1CLIP to generate the I1 current virtual instruction pointer (I1CVIP), which is equal to the I0 next virtual instruction pointer (I0NVIP). A subtracter 930 subtracts the CS.Base from the I1NLIP to generate the I1 next virtual instruction pointer (I1NVIP). The I1 predicted linear target instruction pointer (I1PTLIP) supplied from the BTB 160 is checked for code segment limit violation by module 912. A subtracter 935 subtracts the I1NLIP from the I1PTLIP to generate the I1 predicted displacement (I1DISP).

The I0 and I1 predicted linear instruction pointers (I0PTLIP, I1PTLIP) are delivered to a multiplexer 940. The I0 and I1 predicted displacements (I0PDISP, I1PDISP) are delivered to a multiplexer 945. The I0 and I1 current virtual instruction pointers (I0CVIP, I1CVIP) are delivered to a multiplexer 950. The I0 and I1 next virtual instruction pointers (I0NVIP, I1NVIP) are delivered to a multiplexer 955.

If a D0 190 branch is being processed the I0PTLIB, I0PDISP, I0CVIP, and I0NVIP will be selected from the respective multiplexers 940, 945, 950, and 955. If a D1 195 branch is being processed the I1PTLIB, I1PDISP, I1CVIP, and I1NVIP will be selected from the respective multiplexers 940, 945, 950, and 955. After a specific decoder 190, 195 is selected, the I0 and I1 prefixes on the acronyms is dropped when referring to the output of the particular multiplexer. For example, if a D0 branch is being processed, the I0PDISP is selected from the multiplexer 945 for further processing. The output of the multiplexer 945 is then referred to as PDISP. Therefore, the acronym PDISP represents I0PDISP or I1PDISP depending on the decoder selected. The acronyms for PTLIP, CVIP, and NVIP are treated in a similar manner.

The BAC 180 must work on both I0 and I1 instructions in parallel because both may detect branches. However, the BAC 180 can only process one branch at a time. Instructions dispatched to D0 190 are older in the program flow, so they should be processed first. If a branch is present on D0 190, the I0PDISP is selected from the multiplexer 945. When D0 190 receives a complex instruction, instructions on D1 195 are stalled and recirculated back on to D0 190. Only if D0 190 has a simple instruction and a branch is present on D1 195, will the I1PDISP be selected from the multiplexer 945 to provide the PDISP output.

A comparator 960 compares the PDISP to the actual displacement (ADISP) supplied by the respective D0 190 or D1 195 decoder which decoded the instruction and provides an output to the branch validation/static prediction (BVSP) module 965.

An adder 970 adds the ADISP to the NVIP selected from multiplexer 955 to generate the actual target virtual instruction pointer (ATVIP). The ATVIP is checked for code segment limit violation by module 973. An adder 975 adds the CS.Base to the ATVIP to generate the actual target linear instruction pointer (ATLIP). An adder 980 adds the CS.Base to the NVIP selected from multiplexer 955 to generate the next linear instruction pointer (NLIP). The ATLIP and NLIP are stored in a multiplexer 985.

The BAC 180 responds according to the type of branch detected or missed by the BTB 160. Branches can be conditional (depending on certain criteria which must be evaluated prior to making the branch decision) or unconditional (program will always branch at this point). Branches can also be relative (target address of the branch is contained within the branch instruction) or indirect (target address depends on a value stored in a register or memory). The terms relative and direct are used interchangeably in this specification to indicate branches wherein the target address is contained within the branch instruction.

A call is a special type of unconditional direct branch, wherein the program branches to a new address to complete a series of steps until a return (unconditional indirect branch) is encountered. The return sets the IP to the step following the initial call. Therefore, the target address of the return is dependent on the address of the call. The target addresses for return instructions are stored in the return stack buffer (RSB) 990.

The RSB 990 is a 16 entry triple ported first in, first out (FIFO) stack that keeps track of the return addresses of near call instructions. The RSB 990 has two read ports to service a read based on a BTB top of stack pointer (BTTOS) when a return is seen by the BTB 160 and a read based on a BAC top of stack pointer (BATOS) when a return is seen by the BAC 180. The write port is used based on the BATOS when a call instruction passes through the BAC 180 to increment the BATOS and push the NLIP (which corresponds to the return address) on top of the RSB 990 stack. The BTTOS is stored in register 991 and the BATOS is stored in register 992.

When a return is seen by the BTB 160 or BAC 180, the address corresponding to the respective BTTOS or BATOS is sent as the return address, and the respective BTTOS or BATOS is decremented. In some cases the BTB 160 may detect a call and a subsequent return before the BAC 180 has processed the initial call. The BTB 160 first queries the RR 550 to see if it is valid. If valid, the RR 550 holds the return address needed by the BTB 160 as described above in reference to FIG. 5. If the RR 550 is invalid the RSB 990 is queried through the BTTOS for the return address.

For returns seen by the BAC 180, the BATOS is used to query the RSB 990 and the resulting address is compared by comparator 993 to the PTLIP. The result of the comparison is sent to the BVSP 965, so the BVSP can correct the BTB 160 prediction if the BTB 160 prediction is incorrect.

If a branch prediction is found to be incorrect during the execution stage, the subsequent calls seen by the BAC 180 would be in the wrong program path. In this case, the BATOS is returned to the BATOS value at the time the mispredicted branch went through the BAC 180, and the BTTOS is set to the corrected BATOS value.

It is possible for the RSB 990 to get out of sync when more than 16 calls are encountered in a row or if the actual stack in memory gets modified. Such problems may result in a temporary reduction in processor performance, but any conflicts are eventually resolved in the execute stage.

The behavior of the branch validation/static prediction (BVSP) module 965, depends on the type of branch and whether the branch has been predicted by the BTB 160. As shown in FIG. 9, the BVSP 965 receives the BTB 160 predicted branch decision. The BVSP 965 also receives the branch type and displacement sign from the decoder 190, 195 responsible for decoding the given instruction. The displacement sign indicates the direction of the branch (forward or backward).

If the BAC 180 detects a branch that was missed by the BTB 160, a static prediction algorithm is applied by the BVSP 965 to make the branch decision. For branches detected by the BTB 160, the BVSP 965 validates either the branch decision or the target as specified in FIG. 10. The BAC 180 deals with the complication of self modifying code (SMC) or task switches that can change the instruction bytes in the linear address space, thereby invalidating the BTB 160 branch prediction.

For relative branches that are missed by the BTB 160, the BVSP 965 predicts "taken" for conditional backward branches and unconditional branches and sends ATLIP on the BAC repair IP bus through the multiplexer 985 to the IP multiplexer 215. An IP valid signal is also supplied to the random logic 210 to indicate the BAC 180 correction. The BVSP 965 predicts "not taken" for forward conditional branches.

For relative branches predicted by the BTB 160, the BVSP 965 uses the output of comparator 960 to evaluate if the BTB 160 predicted target matches the BAC calculated target. If the target matches the BTB 160 branch prediction and predicted target are used. If the target does not match, the BAC calculated target, ATLIP, is sent to the IP multiplexer 215, and an IP valid signal is supplied to the random logic 210 to indicate the BAC 180 correction.

SMC or task switches could change a conditional branch into an unconditional branch which may be predicted as "not taken" by the BTB 160. In this case, the BSVP 965 overrides the BTB prediction. SMC or task switches could also change what used to be a branch into a non-branch instruction. The decoders, 190, 195 detect these bogus branches and the NLIP is sent on the BAC repair IP bus through the multiplexer 985 to the IP multiplexer 215. The BTB 160 is instructed by the BAC 180 to de-allocate the bogus entry by setting the valid flag 640 of the BTB entry 634 to zero.

If the decoders 190, 195 detect the branch prediction on a byte other than the last byte of an instruction, the BAC 180 calculates the repair IP as if the BTB 160 had not predicted the branch. The BTB 160 de-allocates the entry by setting the valid flag 640 of the entry to zero.

For call branches that are predicted by the BTB 160, the BVSP 965 checks the branch decision and branch target as if the branch were a relative branch. If the branch decision is "not taken" or if the target is incorrect, the ATLIP is sent as the repair IP. If the BTB 160 misses the call, the ATLIP is sent as the repair IP. All calls seen by the BAC 180 result in the NLIP being sent to the RSB 990.

For return branches that are predicted by the BTB 160, the BTB 160 predicted target (which was supplied by either the RR 550 or the RSB 990 as described above) is compared to the RSB predicted target linear instruction pointer (RSBTLIP) corresponding to the return address pointed to by the BATOS. If the BTB 160 target is correct no changes are made, but if the BTB 160 target is incorrect, the RSBTLIP is sent through the multiplexer 985 as the BAC repair IP to the multiplexer 215. If the return branch missed the BTB 160, the RSBTLIP is used as the BAC repair IP sent to the multiplexer 215.

For indirect branches that are predicted by the BTB 160, the BAC 180 validates the branch decision. Because the actual target resides either in a register or in memory, the validation of the predicted target must be completed during the execution stage. The RISC execution engine 110 compares the BTB predicted target to the actual target. If the target is mispredicted, the actual target from the register or memory location is sent as the BAC repair IP to the multiplexer 215.

For indirect branches that are missed by the BTB 160, the BAC 180 predicts the branch as taken and the NVIP is compared to the actual target by the RISC execution engine 110. If the target is mispredicted, the actual target from the register or memory location is sent as the BAC repair IP to the multiplexer 215.

All branches detected by the BAC 180 are stored in the branch resolution table (BRT) 995. The BRT 995 is a circular FIFO buffer with 12 to 16 entries. It is used during branch resolution to determine the LIP for the corrected instruction flow in case of a branch misprediction. BRT 995 uses a head pointer for allocation and a tail pointer for de-allocation. Branches are allocated in the BRT 995 in program order. The contents of an entry in the BRT 995 are shown in FIG. 11. The fields are Redirect IP 1105 (32 bits), Target VIP 1110 (32 bits), Branch type 1115 (2 bits), prediction 1120 (1 bit), BTB prediction 1125 (1 bit), BRT bactos 1135 (4 bits), BLIP 1140 (20 bits), and ATLIP segment violation 1145 (1 bit).

The Redirect IP 1105 is the LIP which is opposite the predicted target (i.e. the target to which the IFU 150 should be redirected to if the branch prediction is incorrect). For predicted taken branches, Redirect IP 1105 is the NLIP, and for predicted not taken branches, it is the target LIP of the predicted not taken branch. The BAC 180 provides the Redirect IP 1005 for all branches but indirect branches. For indirect branches the BAC 180 receives the target VIP from the RISC execution engine 110, and converts it to a LIP before updating the BRT 995.

The ATVIP (output of adder 970) is installed as the Target VIP 1110 by the BAC 180 for all branches except indirect branches.

The Branch type 1115 represents either jump, call, or return branches. The branch type is sent to the BAC 180 by the appropriate decoder 190, 195.

The prediction 1120 indicates the prediction of the branch, and is used for updating the history bits of the BTB 160 as described above.

The BTB prediction bit 1125 indicates if a branch was predicted by the BTB 160. BTB 160 lookup is not necessary if the branch was missed by the BTB 160. But if the branch was predicted by the BTB 160 (i.e. BTB prediction equals one), the BTB history bits 642 are updated as described above. The purpose of the BTB prediction bit 1125 is to avoid looking up the entry in the BTB 160 if the branch was not detected in the BTB 160.

The BRT bactos 1135 field stores the BACTOS value in the RSB 990 which was current when the branch was seen by the BAC 180. If the branch is determined to be mispredicted the RSB 990 BACTOS is reset to the value stored in the BRT bactos field 1135 as described above, so program flow can proceed along the correct path.

The BLIP field 1140 represents the LIP of the last byte of the branch instruction. This value is used by the BTB 160 to allocate entries and to update the BTB history bits 642 as described above.

The functions of the BPU 130 have been described in detail. To summarize these functions, the IFU 150 attempts to fetch instructions in advance that will be needed by the CISC front end 120. The BPU 130 analyzes these instructions to identify if any possible program branches exist in the program stream. The BTB 160 compares the current instruction to previously encountered branches to look for a match. The BTB 160 predicts the branch decision and branch target address based on the past branches it has seen. The BAC 180 receives actual opcode information on the instruction to verify and/or correct the BTB 160 predictions or misses. The BRT 995 keeps track of branches until they are resolved in the execution stage so that the BTB 160 can be updated. The BRT 995 also holds target information needed in the event of branch misprediction. The IDU 170 interprets the CISC instructions and converts them to RISC type instructions to be sent to the RISC execution engine 110.

If the BPU 130 were successful in predicting all branches correctly, the instructions sent to the RISC execution engine 110 would always be in sequential order, and accordingly, no program branches would ever be taken by the RISC execution engine 110. However, because the branch prediction algorithms are not completely accurate, certain branches sent by the IDU 170 will be predicted incorrectly. This misprediction will require the RISC execution engine 110 to branch to an alternate address in order to continue processing. In this manner, mispredictions of the BPU 130 are identified by branches "taken" by the RISC execution engine 110. Conversely, branches predicted correctly by the BPU 130 are identified by branches "not taken" by the RISC execution engine 110.

Figure 12:
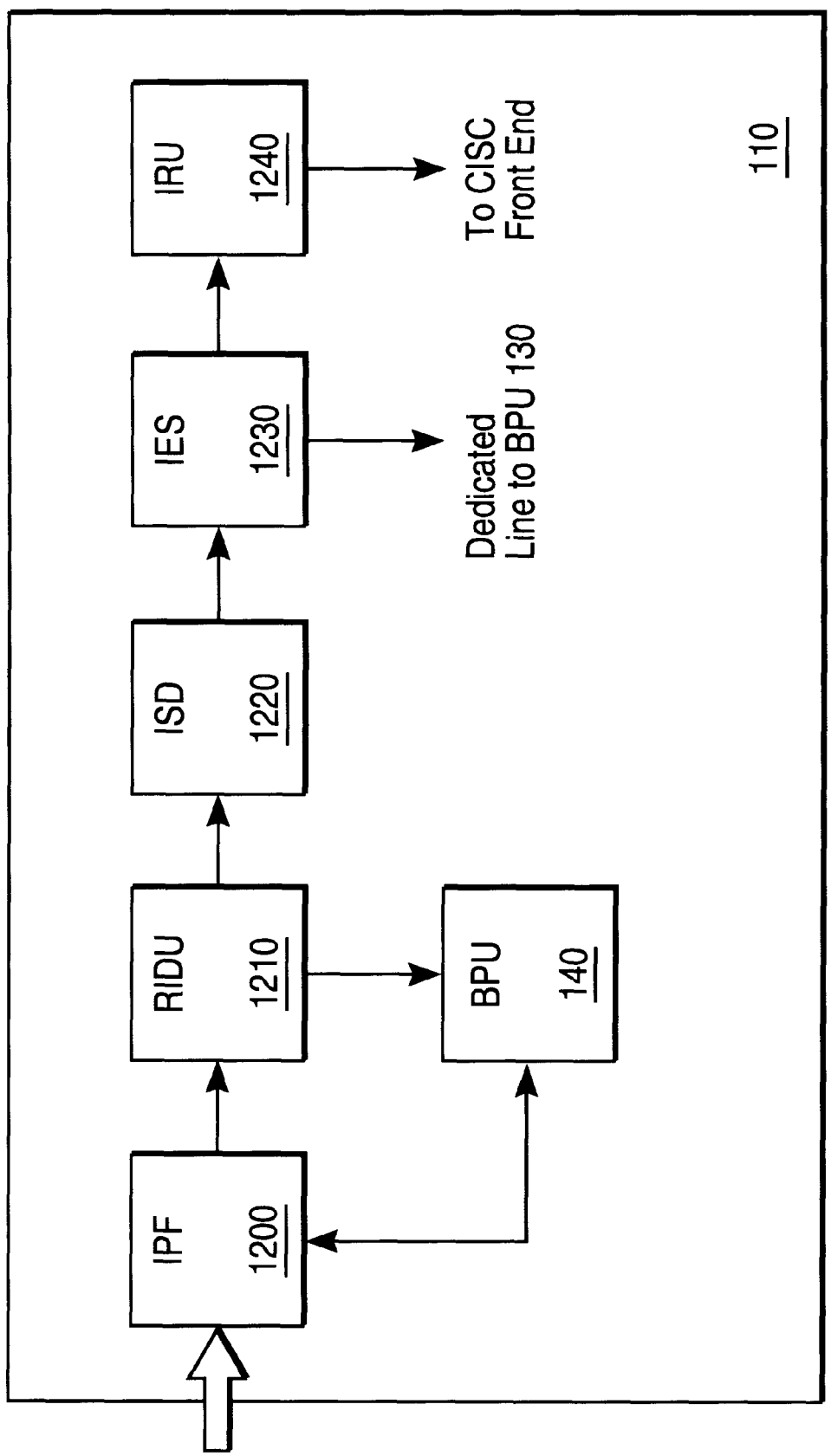
FIG. 12 illustrates a top-level block diagram of a RISC execution engine of the microprocessor of FIG. 1.

Referring to FIG. 12, the RISC execution engine 110 includes an instruction pre-fetch unit (IPF) 1200, the BPU 140, a RISC instruction decode unit (RIDU) 1210, an instruction syllable dispersal unit (ISD) 1220, an instruction execution stage (IES) 1230, and an instruction retirement unit (IRU) 1240.

When the microprocessor 100 is receiving instructions from a RISC based program the IPF 1200 anticipates the instructions that will be needed by the RISC execution engine 110. The BPU 140 predicts the existence of branches, the branch decisions, and the target addresses for the instructions supplied by the IPF 1200. The RIDU 1210 decodes the instructions and provides branch type and branch target information to the BPU 140. The IPF 1200, BPU 140, and RIDU 1210 provide similar basic functions as their respective IFU 150, BPU 130, and IDU 170 counterparts in the CISC front end 120, but are directed towards predicting branches for RISC type instructions. Differences between the algorithms and hardware do exist due to the different branch architecture definitions inherent to the different instruction sets. These differences are not relevant to this specification in that CISC instructions that pass through the CISC front end 120 have already been decoded and translated into RISC instructions, and therefore the branch prediction functions of the BPU 140 are not necessary. The IPF 1200, BPU 140, and RIDU 1210 are bypassed by the CISC front end 120 when CISC type instructions are being executed by the microprocessor 100.

The ISD 1220 is responsible for dispersing instructions to the IES 1230 for execution. Instructions from the IDU 170 are sent directly to the ISD 1220 when the microprocessor 100 is processing CISC type instructions. Only certain CISC branch types which have been decoded by the IDU 170 require further validation. The branch decision and target address for all unconditional direct branches are correctly predicted by BPU 130. Indirect branches require verification of only the target address during the execution stage. The branch decision is guaranteed correct, but the actual target address is stored in a register. Conditional branches, on the other hand, require verification of only the branch decision during the execution stage. The branch target is known for either conditional outcome.

During the conversion of the CISC conditional branch instruction to corresponding RISC commands, the IDU 170 determines a sense bit 1300 for the branch condition, as shown in FIG. 13. The use of the sense bit 1300 is best illustrated by example. Assume the branch statement is "if A=B then branch to ADDRESS", and the BPU 130 predicts "not taken" for this branch. If the branch condition, "A B" evaluates to true (1) the branch will be taken. This example corresponds to line two of the table in FIG. 13. The BPU Prediction 1305 equals 0, and the "Taken indicated by" bit 1310 equals 1. Therefore, the sense bit 1300 equals 1. In terms of Boolean logic, the sense bit 1300 equals the BPU Prediction 1305 XOR the "Taken indicated by" bit 1310. By this definition, if the sense bit 1300 matches the evaluated branch condition, a misprediction has occurred. Conversely, if the sense bit 1300 does not match the evaluated branch condition, the branch was predicted correctly.

The IDU 170 creates a test bit (tbit.ive) instruction to send to the RISC execution engine 110 to evaluate the branch condition associated with a conditional branch. The tbit.ive instruction, when executed by the RISC execution engine 110, uses the sense bit 1300 described above and the outcome of the evaluated branch condition to generate a trigger. The branch condition must be evaluated by the RISC execution engine 110 prior to executing the tbit.ive command. If the sense 1300 and evaluated branch condition match, the tbit.ive instruction evaluates to 1 (i.e. taken branch). If the sense 1300 and evaluated branch condition do not match, the tbit.ive instruction evaluates to 0 (i.e. not taken branch).

The IDU 170 creates a compare (cmpr.ive) instruction to send to the RISC execution engine 110 to evaluate the target address of an indirect branch. The cmpr.ive instruction, when executed by the RISC execution engine 110, compares the predicted branch target to the actual register value to generate a trigger. If the predicted and actual target addresses match, the cmpr.ive instruction evaluates to 0 (i.e. correct target). If the predicted and actual target addresses do not match, the cmpr.ive instruction evaluates to 1 (i.e. incorrect target).

The ".ive" suffixes on the tbit and cmpr instructions differentiate the tbit.ive and cmpr.ive instructions from normal RISC tbit and cmpr instructions. When the ".ive" suffix is encountered, the result of the instruction is sent on a dedicated line from the IES 1230 to the BPU 130. The tbit.ive instruction provides a one bit result. The cmpr.ive instruction provides the result of the comparison and the address of the correct target (the actual value stored in the register).

As stated above the BPU 130 can positively determine all aspects of branch prediction except for outcomes of conditional branches and targets for indirect branches. The tbit.ive and cmpr. ive instructions are executed by the RISC execution engine 110 to verify these two uncertain conditions. If either the tbit.ive or cmpr.ive instructions evaluate to 1, a mispredicted branch is detected.

If the mispredicted branch occurs from a conditional branch being mispredicted, the Redirect IP 1105 from the BRT 995 entry corresponding to the mispredicted branch is sent on the BAC repair IP bus through the multiplexer 985 to the IP multiplexer 215.

If the mispredicted branch occurs due to the wrong target being predicted for an indirect branch, the correct branch target, represented by the result of the cmpr. ive instruction is sent to the BAC 180, converted from a VIP to a LIP, and sent on the BAC repair IP bus through the multiplexer 985 to the IP multiplexer 215. The BRT entry corresponding to the branch is also updated with the correct Target VIP 1110.

Returning to FIG. 12, executed branch instructions are sent from the IES 1230 to the IRU 1240 for retirement. The IRU 1240 sends feedback to the CISC front end to indicate which instructions have been retired by the microprocessor. The IRU 1240 signals the LAB 230 to increment its tail pointer and de-allocate the entry. For retired branch instructions, the values in the BRT 995 and the results of the branch decision are used to update the BTB history bits 640 and the Pattern Table 656 as described above.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A computer system, comprising:
 a) a microprocessor;
 b) an external memory containing a plurality of instructions to be executed by said microprocessor;
 said microprocessor including:
  a fetching unit adapted to retrieve program instructions for a plurality of instruction sets, including branch instructions;
  a branch prediction unit adapted to receive said program instructions from said fetching unit, analyze said program instructions to identify said branch instructions, determine a first branch prediction for each of said branch instructions, and direct said fetching unit to retrieve said program instructions in an order corresponding to said first branch predictions;
  a decode unit adapted to receive said program instructions in the order determined by said branch prediction unit, decode said program instructions into micro-operations, and determine a decoded branch micro-operation corresponding to each of said branch instructions requiring verification;
  an execution engine unit adapted to execute said micro-operations and determine said decoded branch outcome for each of said decoded branch micro-operations and communicate each said decoded branch outcome of taken to said first or second fetching unit such that said first or second fetching unit can re-retrieve said program instructions in a corrected order corresponding to each incorrect said first branch prediction;
  a branch target buffer adapted to receive said actual outcome of each said branch instruction from said execution engine and generate a set of previously encountered branches, wherein each of said program instructions received from said fetching unit has an address which is compared to said set, and wherein said branch target buffer determines a preliminary branch prediction based on the intersection of said set and said address; and
  a branch address calculator adapted to received decoded operation information from said decode unit corresponding to each of said program instructions, receive said preliminary branch prediction from said branch target buffer, and correct said preliminary branch prediction based on said decoded operation information to generate a corrected branch prediction, wherein said first branch prediction comprises said corrected branch prediction if said corrected branch prediction does not equal said preliminary branch prediction and said first branch prediction comprises said preliminary branch prediction if said preliminary branch prediction equals said corrected branch prediction.

2. A microprocessor capable of predicting program branches, comprising:
 a) a fetching unit adapted to retrieve program instructions for a plurality of instruction sets, including branch instructions;
 b) a branch prediction unit adapted to receive said program instructions from said fetching unit, analyze said program instructions to identify said branch instructions, determine a first branch prediction for each of said branch instructions, and direct said fetching unit to retrieve said program instructions in an order corresponding to said first branch predictions;
 c) a decode unit adapted to receive said program instructions in the order determined by said branch prediction unit, decode said program instructions into micro-operations, and determine a decoded branch micro-operation corresponding to each of said branch instructions requiring verification;
 d) an execution engine unit adapted to execute said micro-operations and determine said decoded branch outcome for each of said decoded branch micro-operations and communicate each said decoded branch outcome of taken to said first or second fetching unit such that said first or second fetching unit can re-retrieve said program instructions in a corrected order corresponding to each incorrect said first branch prediction;
 e) a branch target buffer adapted to receive said actual outcome of each said branch instruction from said execution engine and generate a set of previously encountered branches, wherein each of said program instructions received from said fetching unit has an address which is compared to said set, and wherein said branch target buffer determines a preliminary branch prediction based on the intersection of said set and said address; and f) a branch address calculator adapted to received decoded operation information from said decode unit corresponding to each of said program instructions, receive said preliminary branch prediction from said branch target buffer, and correct said preliminary branch prediction based on said decoded operation information to generate a corrected branch prediction, wherein said first branch prediction comprises said corrected branch prediction if said corrected branch prediction does not equal said preliminary branch prediction and said first branch prediction comprises said preliminary branch prediction if said preliminary branch prediction equals said corrected branch prediction.

3. The microprocessor of claim 2, wherein said branch instructions requiring verification comprise conditional branch instructions.

4. The microprocessor of claim 2, wherein said branch instructions requiring verification comprise indirect branch instructions.

5. The microprocessor of claim 2, wherein said branch instruction comprise call instruction and return instructions, each of said program instructions contained within said instruction cache has an address, and said branch target buffer includes:

g) a return register adapted to store a return address corresponding to the address of a program instruction following a call instruction encountered by said branch target buffer, and provide said return address when a return instruction corresponding to said call instruction is encountered.

6. The microprocessor of claim 2, wherein each of said program instructions contained within said instruction cache has an address, and said branch address calculator includes:

g) a branch resolution table adapted to store a target address corresponding to the address of a program instruction following each of said branch instructions based on said first branch prediction and a redirect address corresponding to the address of a program instruction following said branch instruction based on the opposite of said first branch prediction, and send said redirect address to said fetching unit for each incorrect said first branch prediction.

7. The microprocessor of claim 6, wherein said execution engine supplies said redirect address.

8. The microprocessor of claim 2, wherein said fetching unit includes a first fetching unit adapted to retrieve program instructions of a first instruction set and a second fetching unit adapted to retrieve program instructions of a second instruction set.

9. The microprocessor of claim 2, wherein said branch prediction unit includes a first branch prediction unit adapted to make branch predictions for a first instruction set and a second branch prediction unit adapted to make branch predictions for a second instruction set.

10. The microprocessor of claim 2, wherein said decode unit includes a first decode unit adapted to decode a first instruction set and a second decode unit adapted to decode a second instruction set.

11. The microprocessor of claim 10, wherein said first decode unit decodes said first instruction set into instructions of said second instruction set.

12. The microprocessor of claim 9, wherein said first instruction set comprises CISC type instructions and said second instruction set comprises RISC type instructions.

13. The microprocessor of claim 10, wherein said first instruction set comprises CISC type instructions and said second instruction set comprises RISC type instructions.

14. The microprocessor of claim 2, wherein a) said fetching unit includes a first fetching unit adapted to retrieve program instructions of a first instruction set and a second fetching unit adapted to retrieve program instructions of a second instruction set;

b) said branch prediction unit includes a first branch prediction unit adapted to make branch predictions for said first instruction set and a second branch prediction unit adapted to make branch predictions for said second instruction set; and c) said decode unit includes a first decode unit adapted to decode said first instruction set and a second decode unit adapted to decode said second instruction set.

15. The microprocessor of claim 14, wherein said first instruction set comprises CISC type instructions and said second instruction set comprises RISC type instructions.

16. The microprocessor of claim 15, wherein said first decode unit issues special instructions to said execution engine when said branch instructions requiring verification comprise conditional branch instructions and indirect branch instructions, and said execution engine communicates results of executing said special instructions to said first branch prediction unit.

17. A method for predicting program branches in a microprocessor, comprising:

a) fetching program instructions for a plurality of instruction sets to be executed by said microprocessor, including branch instructions;

b) analyzing the program instructions to identify the branch instructions;

c) determining a first branch prediction for each of the branch instructions, comprising:

i) determining an actual outcome of taken or not taken for each branch instruction related to its corresponding decoded branch outcome;

ii) generating a set of previously encountered branches;

iii) comparing the address to the set;

iv) determining a preliminary branch prediction based on the intersection of the set and the address;

v) decoding each of the program instructions to generate decoded operation information;

vi) generating a corrected branch prediction based on the decoded operation information; and vii) generating the first branch prediction, wherein the first branch prediction comprises the corrected branch prediction if the corrected branch prediction does not equal the preliminary branch prediction and the first branch prediction comprises the preliminary branch prediction if the preliminary branch prediction equals the corrected branch prediction;

d) ordering the fetched program instructions corresponding to the first branch predictions;

e) decoding the program instructions to break down the program instructions into micro-operations;

f) determining a decoded branch micro-operation corresponding to each of the branch instructions requiring verification;

g) executing the micro-operations;

h) determining the decoded branch outcome for each of the decoded branch micro-operations; and i) re-fetching the program instructions in a corrected order corresponding to each incorrect first branch prediction.

18. The method as in claim 17, further comprising:

j) determining a branch prediction based on said program instructions without said program instructions being decoded into micro-operations.

19. The method as in claim 17, further comprising:

j) decoding said program instructions of a first instruction set to instructions of a second instruction set.

20. The method as in claim 17, further comprising:

j) determining a branch prediction for each instruction of a first instruction set and k) determining a branch prediction for each instruction of a second instruction set.

21. The method as in claim 17, further comprising:

j) fetching program instructions of a first instruction set and k) fetching program instructions of a second instruction set.

22. The method as in claim 17, further comprising:

j) decoding program instructions of a first instruction set and k) decoding program instructions of a second instruction set.

* * * * *

UNITED STATES PATENT AND TRADEMARK OFFICE
CERTIFICATE OF CORRECTION

PATENT NO. : 6,088,793
DATED : July 11, 2000
INVENTOR(S) : Liu et al.

It is certified that error appears in the above-identified patent and that said Letters Patent is hereby corrected as shown below:

On the title page
In item [75] inventor "Millind Mital" should be --Millind Mittal--.

Signed and Sealed this

First Day of May, 2001

Attest:

NICHOLAS P. GODICI

Attesting Officer     Acting Director of the United States Patent and Trademark Office